US012664851B2

(12) United States Patent
Takahashi

(10) Patent No.: US 12,664,851 B2
(45) Date of Patent: Jun. 23, 2026

(54) OBJECT DISPENSING UNIT OF SPIRAL TYPE

(71) Applicant: SANDEN RETAIL SYSTEMS CORPORATION, Isesaki (JP)

(72) Inventor: Dai Takahashi, Isesaki (JP)

(73) Assignee: SANDEN RETAIL SYSTEMS CORPORATION, Isesaki (JP)

( * ) Notice: Subject to any disclaimer, the term of this patent is extended or adjusted under 35 U.S.C. 154(b) by 472 days.

(21) Appl. No.: 18/025,323

(22) PCT Filed: Jan. 18, 2021

(86) PCT No.: PCT/JP2021/001433
§ 371 (c)(1),
(2) Date: Mar. 8, 2023

(87) PCT Pub. No.: WO2022/059219
PCT Pub. Date: Mar. 24, 2022

(65) Prior Publication Data

US 2023/0360463 A1 Nov. 9, 2023

(30) Foreign Application Priority Data

Sep. 17, 2020 (JP) ................................. 2020-156049

(51) Int. Cl.
*G07F 11/24* (2006.01)
*G07F 11/54* (2006.01)

(52) U.S. Cl.
CPC .............. *G07F 11/24* (2013.01); *G07F 11/54* (2013.01)

(58) Field of Classification Search
CPC ........... G07F 11/24; G07F 11/36; G07F 11/54
See application file for complete search history.

(56) References Cited

U.S. PATENT DOCUMENTS 3,773,217 A * 11/1973 Schlaf ..................... G07F 11/60 221/75
3,929,255 A * 12/1975 Wittern ................... G07F 11/36 221/75
(Continued)

FOREIGN PATENT DOCUMENTS

JP 62-17908 5/1987
JP 7-114669 5/1995
(Continued)

OTHER PUBLICATIONS

International Search Report dated Mar. 5, 2021 issued in corresponding application PCT/JP2021/001433.

*Primary Examiner* — Gene O Crawford
*Assistant Examiner* — Kelvin L Randall, Jr.
(74) *Attorney, Agent, or Firm* — COZEN O'CONNOR

(57) ABSTRACT

A spiral-type object dispensing unit (1) includes: a box-shaped column (2) having an opening (22) in the lower surface; a motor unit (3) including motor (11); and spiral (20) disposed in the column (2), the spiral detachably joined to rotary shaft (14) of the motor (11) at an upper end and extending spirally toward the opening (22) of the column (2) at a lower end. Products supported by the spiral (20) are dispensed from opening (22) by motor (11) rotating and driving spiral (20). A spiral unit (4) including spiral (20) and guide (21) is interchangeable between a first spiral unit that includes a first guide extending in a vertical direction on a central axis of the spiral (20) and a second spiral unit that includes a second guide extending in the vertical direction to the left of the central axis.

8 Claims, 7 Drawing Sheets

(56) References Cited

U.S. PATENT DOCUMENTS

| | | | | | |
|---|---|---|---|---|---|
| 3,986,637 | A * | 10/1976 | Wittern | G07F 11/36 221/75 |
| 4,258,860 | A * | 3/1981 | Boettcher | G07F 11/42 221/75 |
| 4,369,896 | A * | 1/1983 | Boettcher | G07F 11/42 221/75 |
| 4,385,713 | A * | 5/1983 | Boettcher | G07F 11/42 221/241 |
| 4,674,653 | A * | 6/1987 | Suzuki | G07F 9/02 221/6 |
| 4,757,915 | A * | 7/1988 | Albright | G07F 11/42 221/75 |
| 4,872,592 | A * | 10/1989 | Anazawa | G07F 11/60 221/6 |
| 4,944,414 | A * | 7/1990 | Albright | G07F 11/42 211/59.3 |
| 6,776,306 | B1 * | 8/2004 | Michael | G07F 11/42 221/6 |
| 2009/0283539 | A1 * | 11/2009 | Borra | G07F 11/36 221/258 |
| 2014/0190985 | A1 * | 7/2014 | Chen | G07F 11/42 221/277 |
| 2015/0102051 | A1 * | 4/2015 | Shimmerlik | G07F 11/60 221/92 |

FOREIGN PATENT DOCUMENTS

| | | |
|---|---|---|
| JP | 8-77448 | 3/1996 |
| JP | 9-198566 | 7/1997 |
| JP | 2001-109947 | 4/2001 |

* cited by examiner

OBJECT DISPENSING UNIT OF SPIRAL TYPE

RELATED APPLICATIONS

This is a U.S. National Phase Application under 35 USC 371 of International Application PCT/JP 2021/001433 filed on Jan. 18, 2021.

This application claims the priority of Japanese application no. 2020-156049 filed Sep. 17, 2020, the entire content of which is hereby incorporated by reference.

TECHNICAL FIELD

The present invention relates to an object dispensing unit using a spiral.

BACKGROUND ART

A spiral-type object dispensing unit used in a vending machine or the like is a device that stores objects inserted between spirals disposed in a column, and rotates and drives one end of the spiral by a motor to dispense the objects sequentially from the other end of the spiral.

In recent years, it has become common for a single vending machine to be able to store and sell a plurality of types of objects, and further, a vending machine equipped with a spiral-type object dispensing unit that can store and sell objects of different sizes has been developed.

For example, in a spiral-type object dispensing unit (product delivery device) disclosed in Japanese Utility Model Publication No. 62-17908, a motor for driving a spiral is configured to be movable in the width direction of a column, and the spiral is moved relative to the column to enable objects (products) of different widths to be stored.

Further, the spiral-type object dispensing unit of the vending machine described in Japanese Utility Model Publication No. 62-17908 is provided with a spiral extending in a substantially horizontal direction and a product placement plate on which objects are placed. The product placement plate rotatably supports the rotary shaft of the motor at one end, extending in the direction of the central axis of the spiral, and is fixed to the column at the other end, the plate having the function of a guide that guides the movement of a product at the time of dispensing the product by the rotation of the spiral.

SUMMARY OF THE INVENTION

Problems to be Solved by the Invention

However, even if the spiral is made movable in the width direction of the column as in Japanese Utility Model Publication No. 62-17908, when the diameter of the spiral is relatively large, the movable distance of the spiral in the width direction is restrained. Further, a problem is that the size of a product that can be stored is limited by the guide. There is a particular need for a spiral-type object dispensing unit that is suitable for a column and a spiral to be disposed to extend in the vertical direction and that can store and dispense objects of various sizes.

An object of the present invention, which has been made in view of the above problems, is to provide a spiral-type object dispensing unit that can ensure a large storage width for objects and can store objects of various sizes.

Means for Solving the Problems

In order to solve the above problem, a spiral-type object dispensing unit according to the present invention is a spiral-type object dispensing unit including: a column having an opening on at least one surface; a motor part supported by the column; and a spiral disposed in the column, the spiral being detachably joined to a rotary shaft of the motor part at one end and extending spirally toward the opening of the column at the other end to support an object. The spiral-type object dispensing unit sequentially dispensing the object supported by the spiral from the opening of the column by the motor part rotating and driving the spiral. The spiral-type object dispensing unit comprises a guide extending from the one end to the other end of the spiral and detachably supported by the column on the other end side of the spiral. The spiral is supported so as to be movable in the width direction of the column. The guide is interchangeable between a first guide that extends at least on a central axis of the spiral and a second guide that extends at a position different from the central axis of the spiral in the width direction of the column.

Preferably, the column includes a first support that supports the other end side of the first guide, and a second support that supports the other end side of the second guide.

Preferably, the spiral and the first guide constitute a first spiral unit, the spiral and the second guide constitute a second spiral unit, and one of the first spiral unit and the second spiral unit is selectively disposed in the column.

Preferably, the first guide extends on the central axis of the spiral; and the spiral is movable to a center position of the column in the width direction.

Preferably, the central axis of the spiral extends in a vertical direction and is disposed such that the one end is on an upper side and the other end is on a lower side, the column has at least a rear wall and left and right sidewalls, the first guide is supported by the rear wall of the column at the other end side, and the second guide is supported by one of the left and right sidewalls of the column at the other end side.

Preferably, the motor part is supported on a wall surface of the column on the one end side of the spiral so as to be slidable at least in the width direction of the column.

Preferably, the motor part is fixed to the column by being moved to a wall surface of the column on the one end side of the spiral in a direction perpendicular to the width direction of the column at a selected position among a plurality of positions in the width direction of the column.

Preferably, the first support and the second support are each marked with an identification indicating that the first support or the second support is used in correspondence with the first guide or the second guide.

Advantageous Effects of the Invention

According to the spiral-type object dispensing unit of the present invention, by disposing the spiral at the center position in the width direction of the column and using the first guide, objects with the same width can be stored in the column on each of the left and right sides of the first guide.

Further, by moving the spiral in the width direction of the column from the center position in the width direction and disposing the spiral, objects with a large width can be stored in one of the left and right sides of the guide. Moreover, by using the second guide extending from the central axis of the spiral to a different position in the width direction of the column, the second guide can be further moved in the width direction of the column to store objects with a further larger width in the column.

As thus above, by moving the spiral in the width direction in the column and replacing the guide from the first guide to the second guide, objects with a large width can be stored. Therefore, it is possible to provide a spiral-type object dispensing unit capable of storing objects with various widths in a wide range.

MODE FOR CARRYING OUT THE INVENTION

An embodiment of the present invention will be described below with reference to the drawings.

Figure 1:
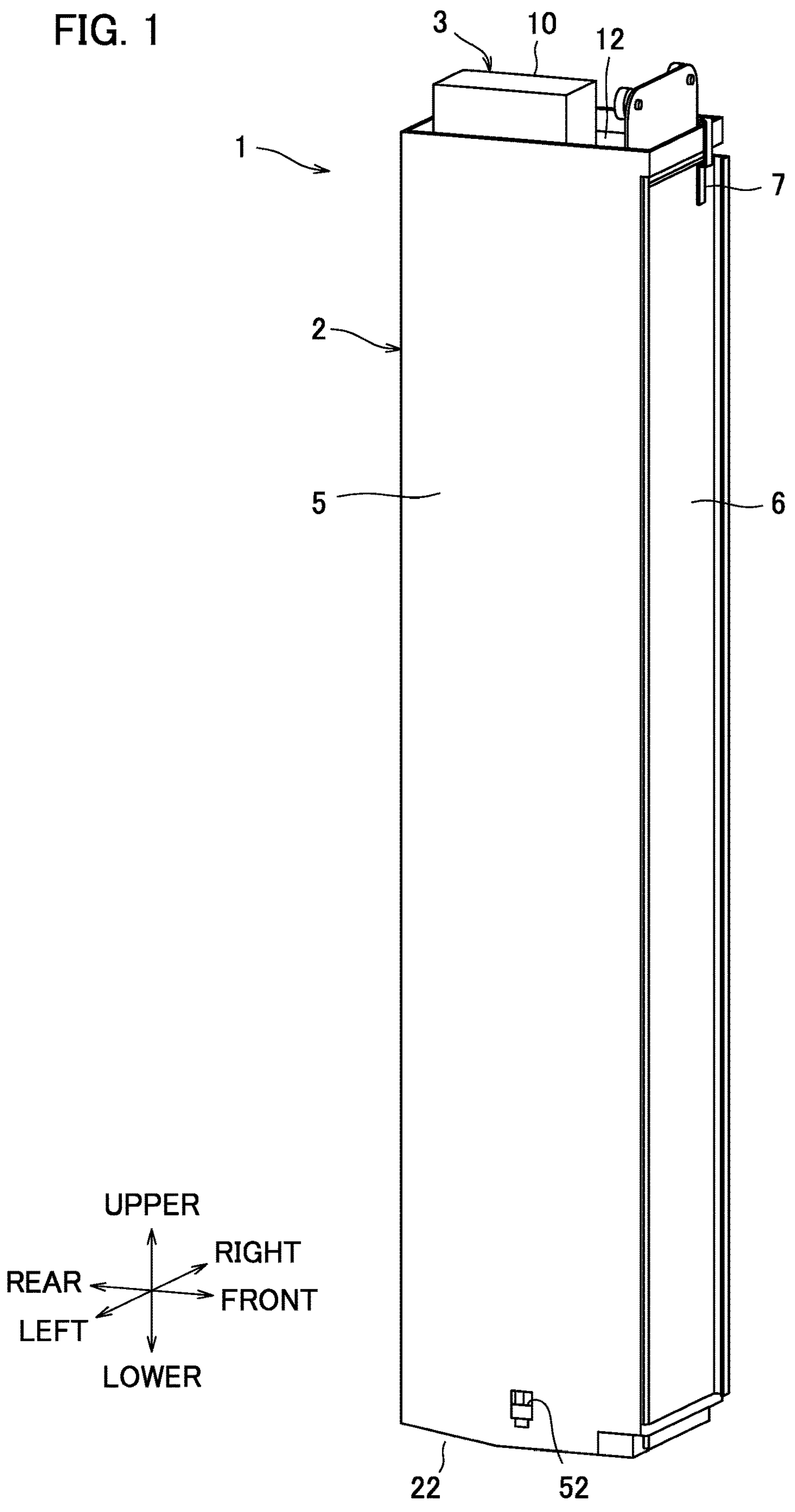
FIG. 1 is a perspective view illustrating an outer shape of a spiral-type object dispensing unit according to the present embodiment.
Figure 2:
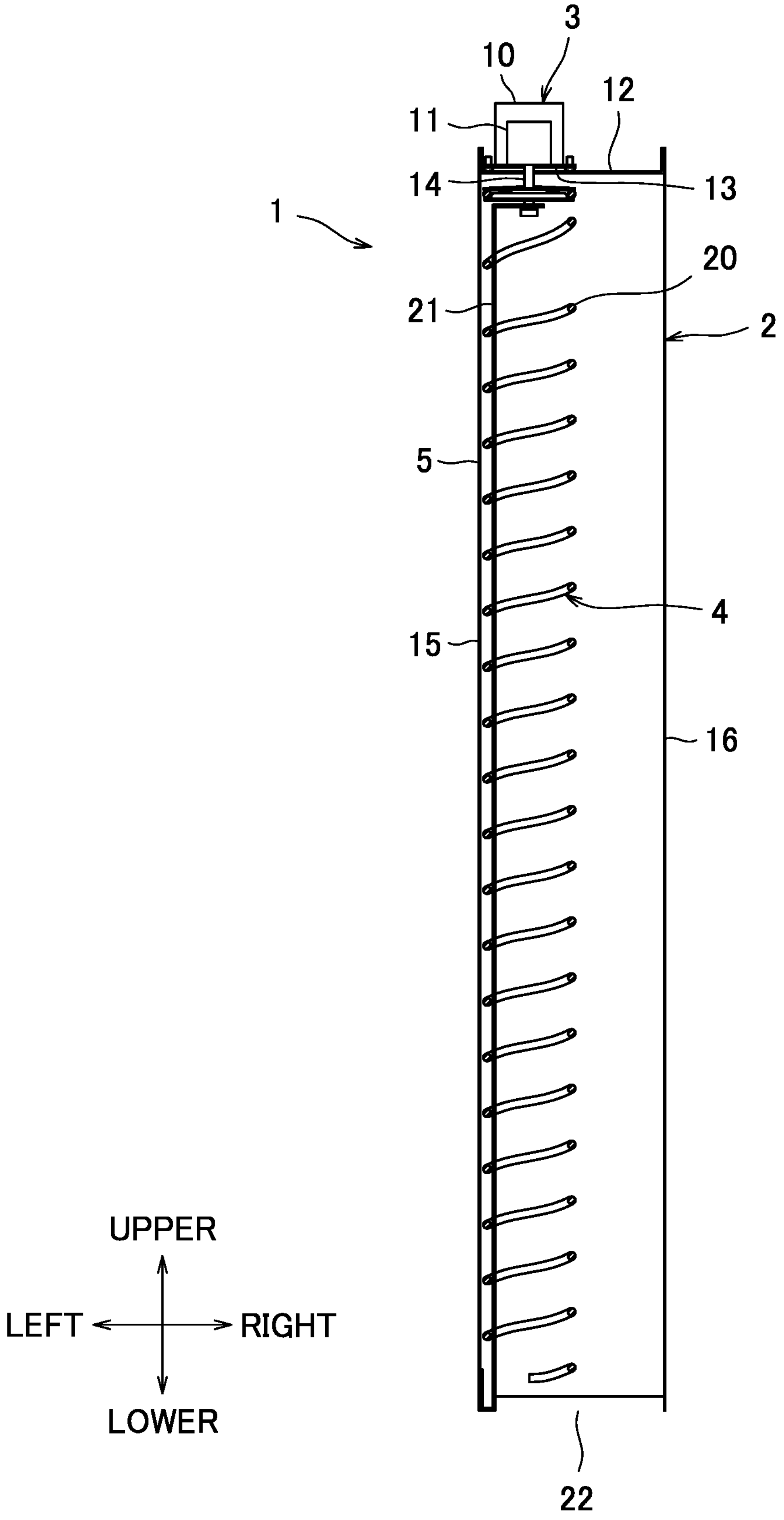
FIG. 2 is a longitudinal sectional view of the spiral-type object dispensing unit according to the present embodiment.

FIG. 1 is an external view of a spiral-type object dispensing unit 1 according to the embodiment of the present invention. FIG. 2 is a longitudinal sectional view of the spiral-type object dispensing unit 1 according to the present embodiment.

The spiral-type object dispensing unit 1 according to one embodiment of the present invention is employed, for example, in a vending machine and has a function of storing products (objects) to be sold, operating in response to the purchase operation of a purchaser or the like, and dispensing the products one by one.

In the vending machine, one or more spiral-type object dispensing units 1 are provided detachably inside a box-shaped body.

As illustrated in FIGS. 1 and 2, the spiral-type object dispensing unit 1 according to the present embodiment includes a column 2, a motor unit 3 (motor part), and a spiral unit 4.

The column 2 is formed in a box shape long in the vertical direction with the lower surface (one surface) open. The column 2 includes a box-shaped body 5 with the front and lower surfaces open, and a lid 6 covering the opening on the front surface of the body 5. The lid 6 is supported by the body 5, can open and close the opening on the front surface of the body 5, and is fixed to the body 5 by a lock member 7 in a closed state.

The motor unit 3 houses a motor 11 in a box-shaped case 10 and is mounted on an upper wall 12 (wall surface) of the column 2.

The motor 11 is fixed to a base plate 13 that is a lower wall of the case 10. A rotary shaft 14 of the motor 11 protrudes below the base plate 13 and the upper wall 12 of the column 2 at a leading end (lower end) of the shaft and is disposed so as to extend in the vertical direction in parallel with left and right sidewalls 15, 16 of the column 2.

The spiral unit 4 is made up of a spiral 20 and a guide 21.

The spiral 20 is formed by spirally winding a round-bar-shaped member. The spiral 20 is detachably fixed to the rotary shaft 14 of the motor 11 at one end (upper end) with a central axis extending downward on the same axis as the rotary shaft 14 of the motor 11, and extends, at the other end (lower end), to the vicinity of the opening 22 at the lower end of the column 2.

The guide 21 is supported at an upper end at the center of the upper end of the spiral 20, extending vertically in the spiral 20, and extends, at a lower end (the other end), radially outward of the spiral 20 at a position lower than the lower end of the spiral 20 and is detachably fixed to the column 2.

In the spiral unit 4, the spiral 20 and the guide 21 are integrally formed and are detachably joined to the column 2 and the rotary shaft 14 of the motor 11.

Note that the guide 21 illustrated in FIG. 2 shows the shape of a second guide 51 to be described later, and the spiral unit 4 shows the shape of a second spiral unit 50 to be described later.

In the spiral-type object dispensing unit 1 with the configuration described above, the lid 6 of the column 2 is opened, products are each inserted between the pitches of the spiral 20 through the opening on the front surface, and the products are stored in the column 2. Hence the products are stored in the column 2 in the vertical direction.

Then, the motor 11 is driven to rotate and drive the spiral 20, whereby the products supported by the spiral 20 in the column 2 move downward and are taken out one by one from the opening 22 in the lower part of the column 2.

Figure 3:
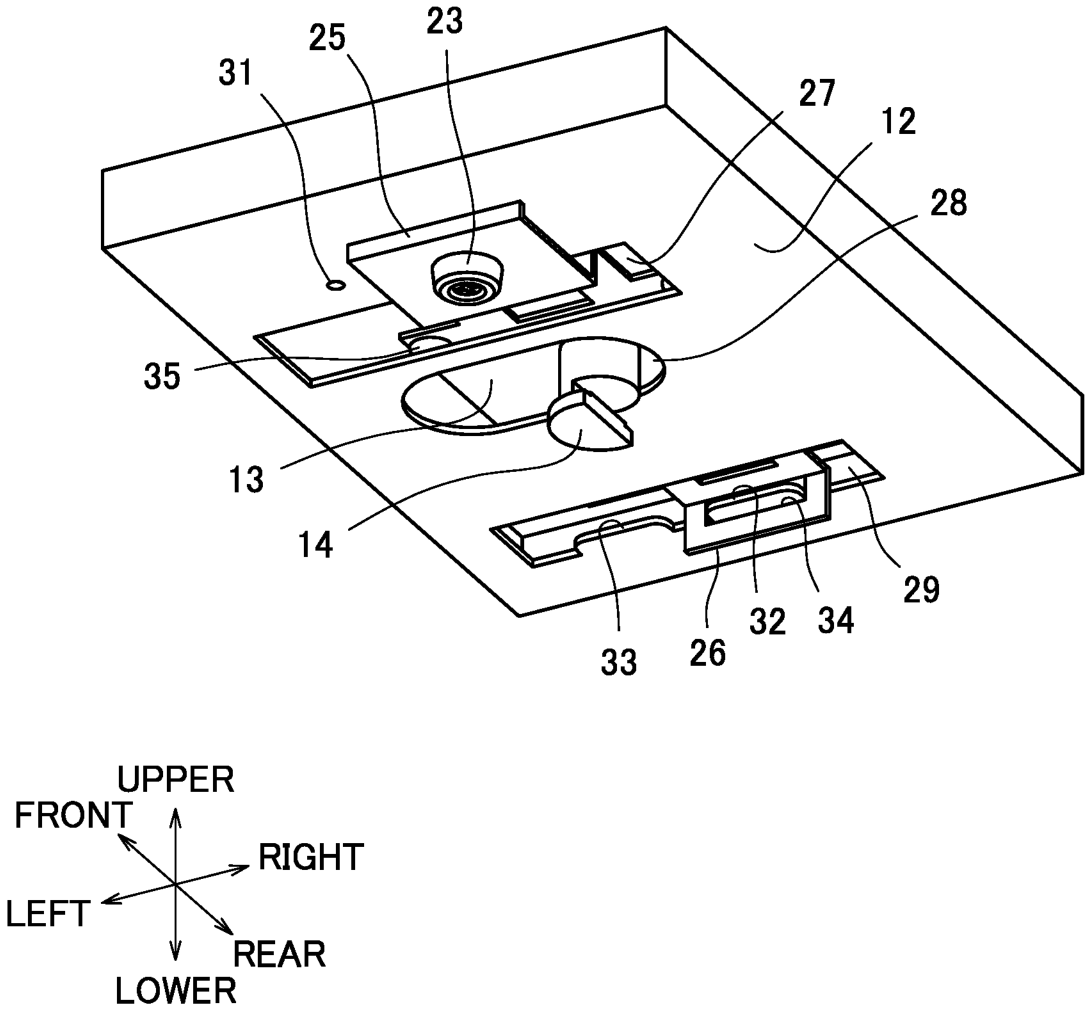
FIG. 3 is a perspective view illustrating a structure of a mounting part of a motor unit.
Figure 4:
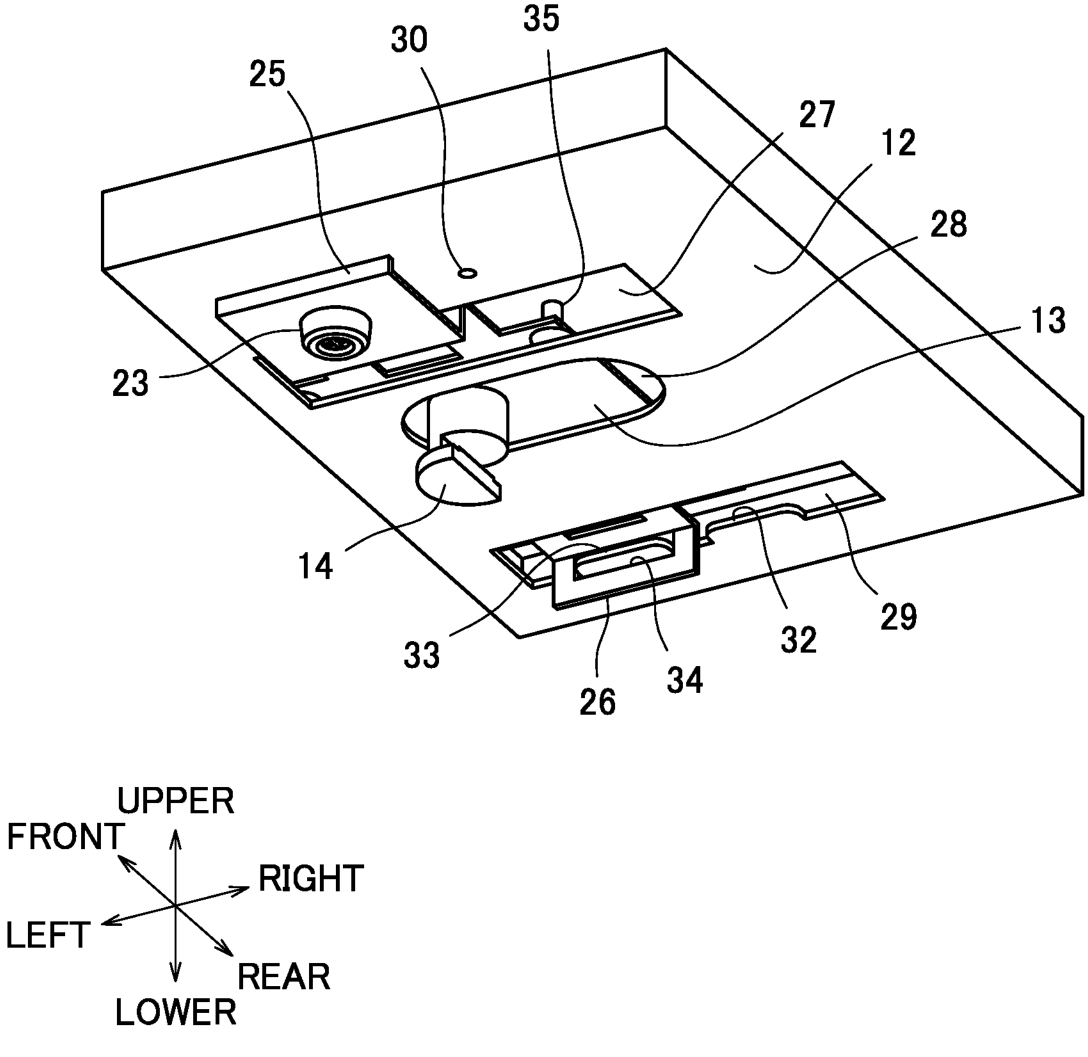
FIG. 4 is a perspective view illustrating the structure of the mounting part of the motor unit in a sliding state.
Figure 5:
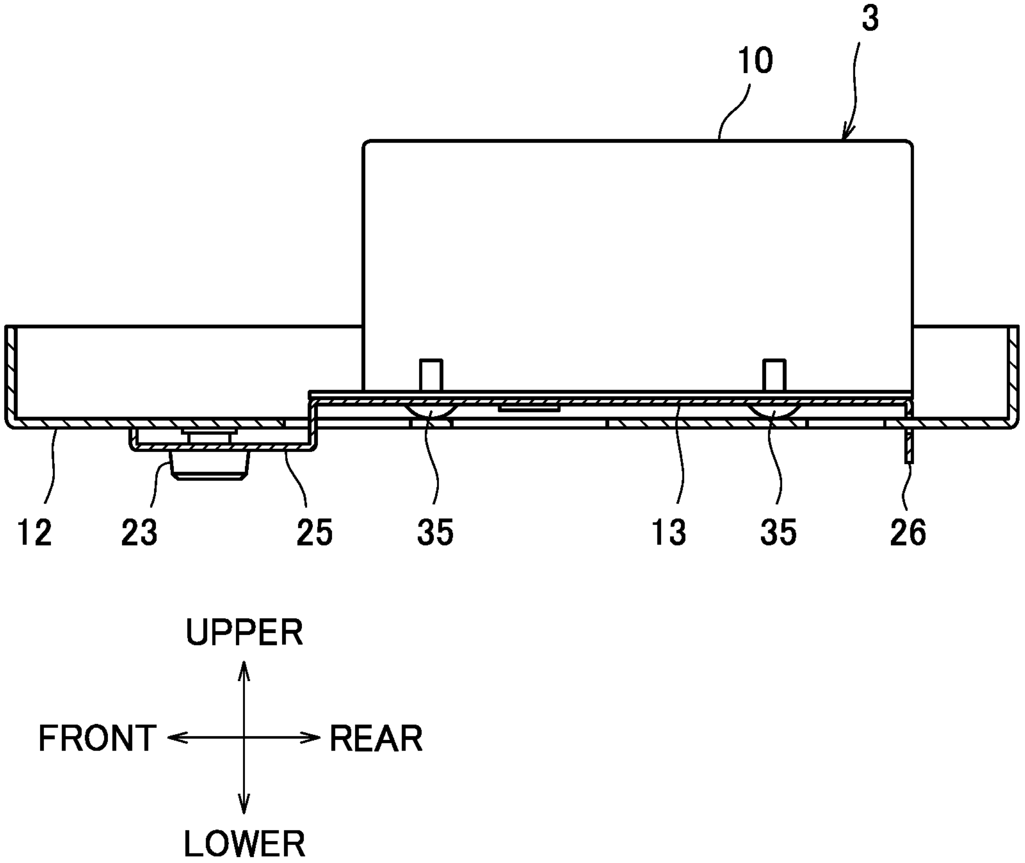
FIG. 5 is a longitudinal sectional view illustrating the structure of the mounting part of the motor unit.

FIGS. 3 and 4 are perspective views illustrating the structure of the mounting part of the motor unit 3. FIGS. 3 and 4 are views of the upper wall 12 of column 2 as seen obliquely from below. FIG. 3 illustrates a state in which the motor unit 3 is located at the center position in the width direction of the column 2, the state being suitable for mounting a first spiral unit 40 to be described later. FIG. 4 illustrates a state in which the motor unit 3 is at a sliding position where the motor unit 3 has been slid leftward from the center position, the state being suitable for mounting the second spiral unit 50 to be described later. FIG. 5 is a longitudinal sectional view illustrating the structure of the mounting part of the motor unit 3.

As illustrated in FIGS. 3 to 5, the base plate 13 is formed of a rectangular plate-shaped member, is bent at the front and the rear, and includes a sliding support 25 fixed to the upper wall 12 of the column 2 at the front and a positioning part 26 for positioning relative to the upper wall 12 at the rear.

The sliding support 25 is formed by bending the front of the base plate 13 in a substantially L-shape and has a portion disposed on the lower side of the upper wall 12 so as to extend along the lower surface of the upper wall 12. The positioning part 26 is a portion formed by perpendicularly bending the rear of the base plate 13 downward and protrudes below the upper wall 12. Note that the sliding support 25 is located ahead of the rotary shaft 14 of the motor, and the positioning part 26 is located behind the rotary shaft 14 of the motor.

The upper wall 12 of the column is provided with a first elongated hole 27 into which the sliding support 25 is inserted, a second elongated hole 28 into which the rotary shaft 14 of the motor is inserted, and a third elongated hole 29 into which the positioning part 26 is inserted. The first elongated hole 27, the second elongated hole 28, and the third elongated hole 29 are formed so as to extend in the width direction of the column 2, and the base plate 13 is configured to be movable in the width direction of the column 2 (more specifically, in the left-right width direction).

The sliding support 25 has a hole into which a fixing screw 23 is inserted. Meanwhile, the upper wall 12 of the column 2 has female screw holes 30, 31 for fastening a plurality of fixing screws 23 spaced in the width direction (at two locations). The base plate 13 and the upper wall 12 are fixed by inserting the fixing screw 23 into the hole from the lower side of the sliding support 25 and tightening the fixing screw 23 to either of the female screw holes 30, 31 of the upper wall 12 of the column 2. Thereby, the motor unit 3 and the column 2 are fixed to each other.

The upper wall 12 of the column 2 is provided with two protrusions 32, 33 protruding forward at the rear-side edge of the third elongated hole 29. The protrusions 32, 33 are inserted into a positioning hole 34 provided in the positioning part 26 of the base plate 13 so as to restrict the movement of the base plate 13 in the width direction relative to the column 2. The two protrusions 32, 33 are spaced in the width direction of the column 2.

As illustrated in FIG. 3, when the fixing screw 23 passing through the hole of the sliding support 25 is fastened to the screw hole 30 on the right side of the upper wall 12, the protrusion 32 on the right side is inserted into the positioning hole 34 of the positioning part 26. At this time, the rotary shaft 14 of the motor 11 is located at the center position in the width direction of the column 2. Note that a position to which the base plate 13 has been moved, that is, a position in the width direction of the column 2 to which the motor unit 3 has moved in the width direction, in this state is the center position.

As illustrated in FIG. 4, when the fixing screw 23 passing through the hole of the sliding support 25 is fastened to the left female screw hole 31 in the upper wall 12, the protrusion 33 on the left side is inserted into the positioning hole 34 of the positioning part 26. At this time, the rotary shaft 14 of the motor 11 is located to the left of the center position in the width direction of the column 2. Note that a position to which the base plate 13 has been moved, that is, a position in the width direction of the column 2 to which the motor unit 3 has moved in the width direction, in this state is the sliding position.

The first elongated hole 27, the second elongated hole 28, and the third elongated hole 29 are formed large in the front-rear direction such that the sliding support 25 and the positioning part 26 of the base plate 13 and the rotary shaft 14 of the motor 11 can move forward relative to the fixed position between the column 2 and the motor unit 3 as illustrated in FIG. 3 or 4. Moving the motor unit 3 forward from the fixed position in this way makes the motor unit 3 movable between the center position and the sliding position in the width direction.

As illustrated in FIG. 5, on the lower surface of the base plate 13 of the motor unit 3, for example, a pan-head-shaped screw 35 having a substantially hemispherical head is fastened at each of four locations, and the head of the screw 35 is fixed so as to face downward. The head of the screw 35 is in contact with the upper wall 12 of the column 2, and the base plate 13 and the upper wall 12 of the column 2 are separated from each other in the vertical direction.

Figure 6:
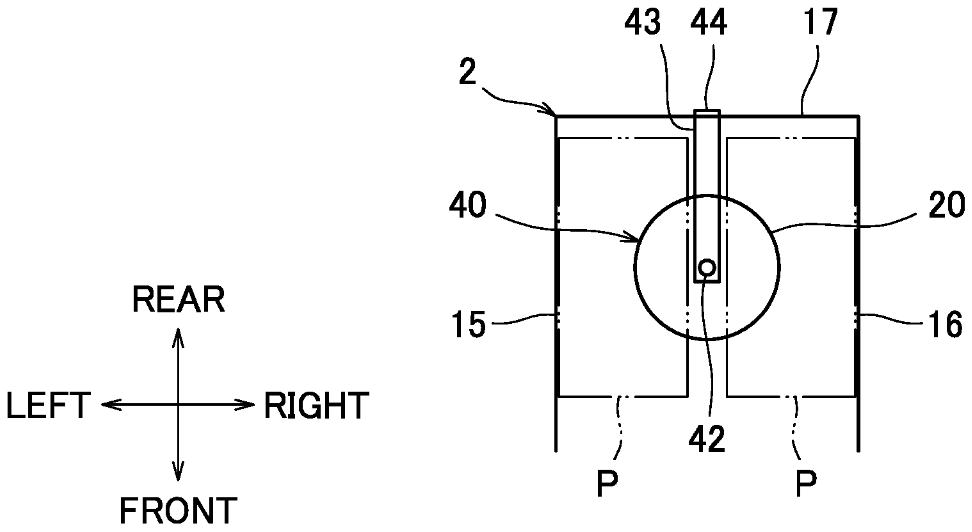
FIG. 6 is a top view of a column, illustrating an example of storing products when a first spiral unit is mounted.
Figure 7:
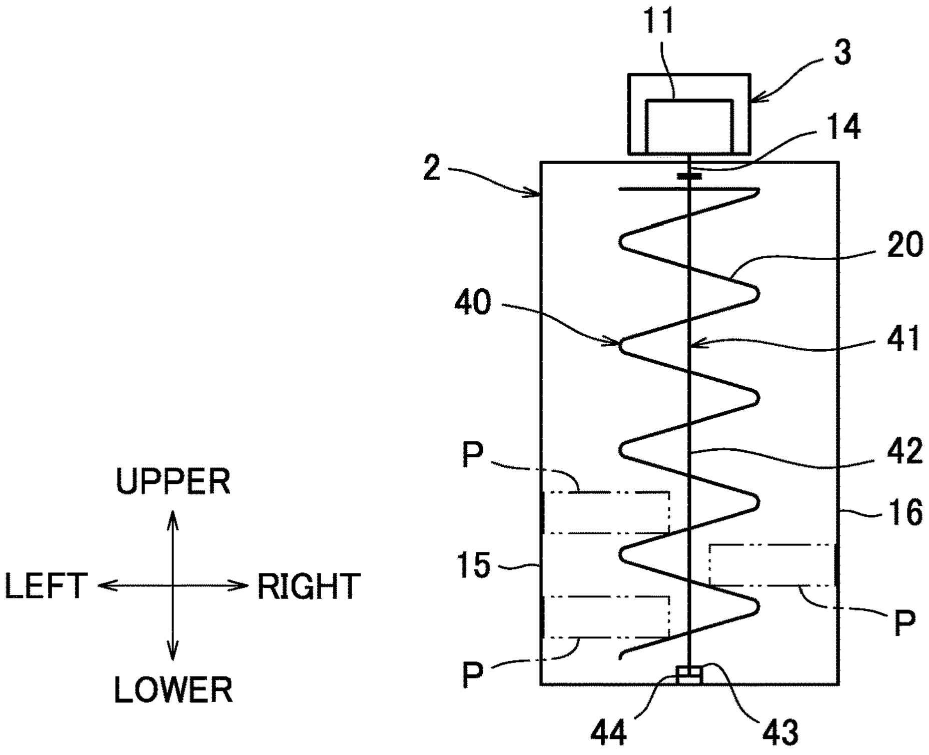
FIG. 7 is a front view of the column, illustrating the example of storing products when the first spiral unit is mounted.
Figure 8:
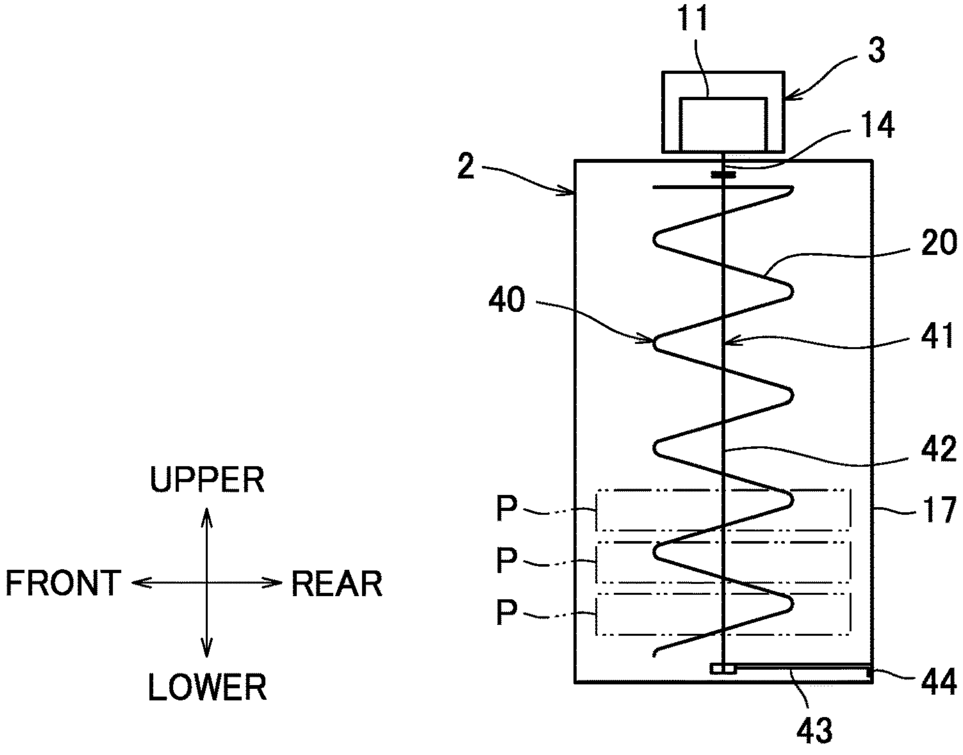
FIG. 8 is a side view of the column, illustrating the example of storing products when the first spiral unit is mounted.

FIGS. 6 to 8 are explanatory views illustrating an example of storing products P when the first spiral unit 40 is mounted. FIG. 6 is a top view of the column 2, FIG. 7 is a front view of the column 2, and FIG. 8 is a side view of the column 2.

Figure 9:
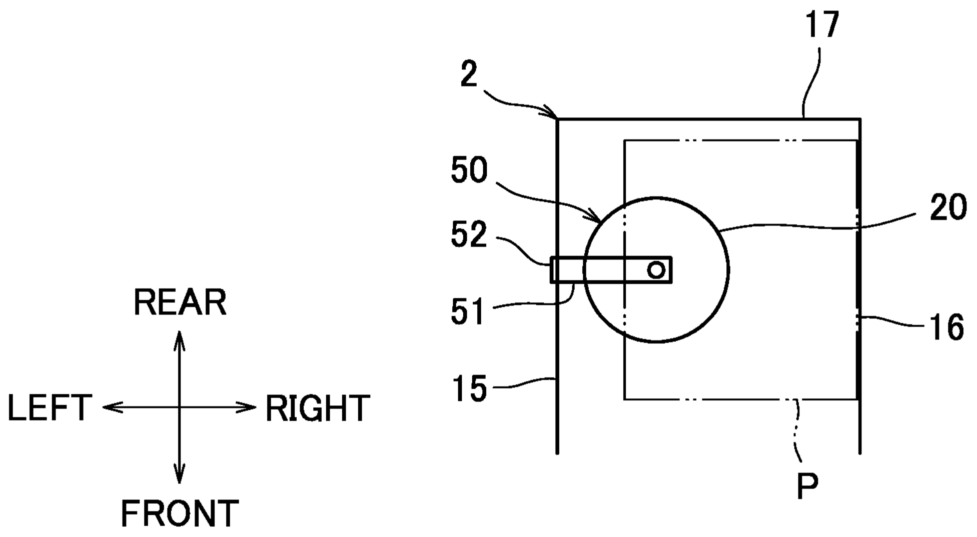
FIG. 9 is a top view of the column, illustrating an example of storing products when a second spiral unit is mounted.
Figure 10:
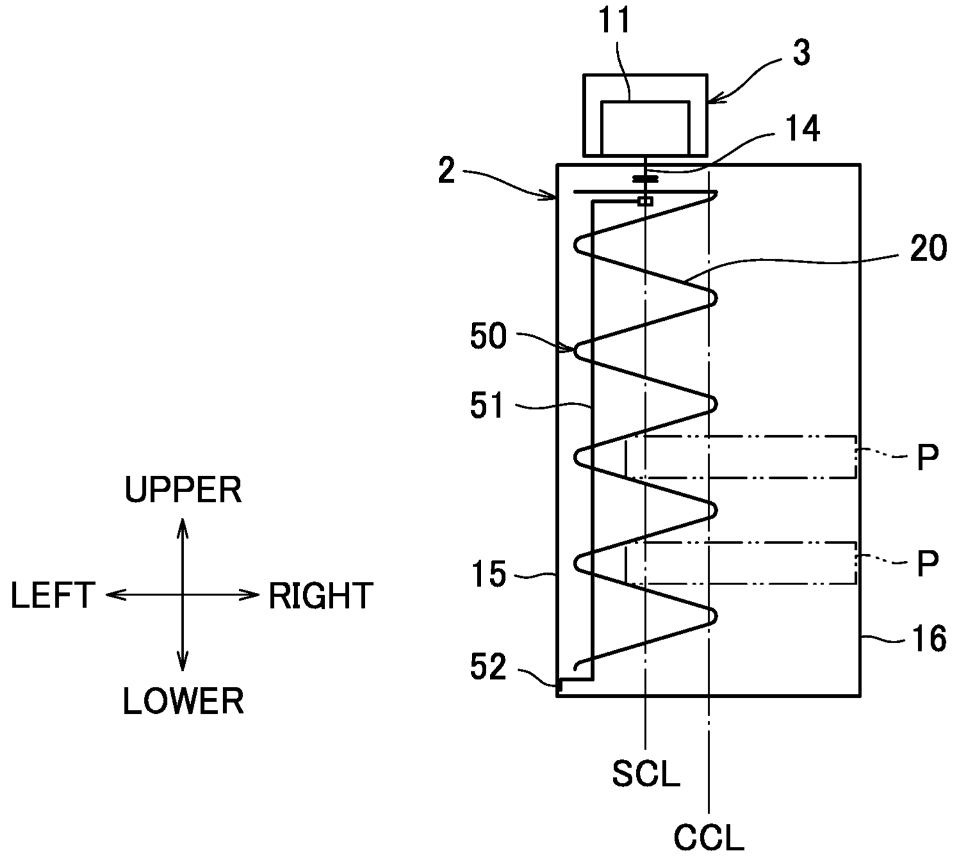
FIG. 10 is a side view of the column, illustrating an example of storing products when the second spiral unit is mounted.

FIGS. 9 and 10 each illustrate an example of storing the products P when the second spiral unit 50 is mounted. FIG. 9 is a top view of the column 2, and FIG. 10 is a front view of the column 2.

In the spiral-type object dispensing unit 1 according to the present embodiment, as the spiral unit 4, a first spiral unit 40 and a second spiral unit 50 with the guides 21 having different shapes are prepared in advance. The first spiral unit 40 or the second spiral unit 50 is selectively mounted in the column 2.

As illustrated in FIGS. 6 to 8, a first guide 41, which is a guide of the first spiral unit 40, is made up of a central shaft 42, which is a rod-shaped member, and a support plate 43, which is a plate-shaped member. The central shaft 42 is fixed to the upper end of the spiral 20 at an upper end of the shaft, extends downward on the central axis of the spiral 20 and below the lower end of the spiral 20.

The support plate 43 is a plate-shaped member that rotatably supports the lower end of the central shaft 42, extends rearward from the lower end of the central shaft 42, and is detachably fixed to a first support 44 provided on a rear wall 17 of the column 2. Note that the first support 44 may be a hole provided in the rear wall 17, for example, and may be structured such that the end of the support plate 43 can be fixed by being hooked. In addition, it is preferable that the first support 44 be marked with an identification indicating, by color, letter, or the like, that the first support 44 is to be used when the first spiral unit 40 is mounted.

In the first spiral unit 40, the spiral 20 and the central shaft 42 are rotated by the rotation of the rotary shaft 14 of the motor 11.

When the first spiral unit 40 is mounted, the position of the base plate 13 of the motor unit 3 is preferably set to the center position as illustrated in FIG. 3 above, and the central axis of the spiral 20 is preferably set to the center position in the width direction of the column 2.

By setting the central axis of the spiral 20 of the first spiral unit 40 at the center position in the width direction of the column 2 in this manner, it is possible to store, in one column 2, a total of two rows of products P with substantially the same width on the left and right sides of the central shaft 42, respectively. Then, by rotating the spiral 20 half a turn, the products P on the left and right sides of the central shaft 42 can be sequentially dispensed from the lower opening 22 of the column 2.

As illustrated in FIGS. 9 and 10, the second guide 51, which is a guide of the second spiral unit 50, is formed by bending both ends of a plate-shaped member. The upper end of the second guide 51 is rotatably supported relative to the rotary shaft 14 of the motor 11, and the lower end thereof is detachably fixed to a second support 52 provided on the left sidewall 15 of the column 2. It is preferable that the second support 52 is marked with an identification indicating, by color, letter, or the like that the second support 52 is to be used when the second spiral unit 50 is mounted.

The second guide 51 of the second spiral unit 50 extends radially outward of the spiral 20 from the support position of the rotary shaft 14 at the upper portion and extends downward in parallel with a central axis SCL of the spiral 20 in a position radially outward of a central axis SCL of the spiral 20 inside the spiral 20, that is, in a position closer to the left sidewall 15 of the column 2 than the central axis SCL of the spiral 20. The lower end of the second guide 51 extends below the spiral 20 toward the second support 52 of the left sidewall 15 of the column 2.

In the second spiral unit 50, the spiral 20 rotates by the rotation of the rotary shaft 14 of the motor 11, but the second guide 51 does not rotate or move.

When the second spiral unit 50 is mounted, the position of the base plate 13 of the motor unit 3 is set to the sliding position as illustrated in FIG. 4 above, and the central axis SCL of the spiral 20 is set to the left of the center position CCL in the width direction of the column 2.

By positioning the central axis SCL of the spiral 20 to the left of the center position CCL in the width direction of the column 2 in this manner, wide products P can be stored on the right side of the second guide 51 in the column 2. Further, by using the second spiral unit 50, the second guide 51 is located to the left of the central axis SCL of the spiral 20, so that wider products P can be stored between the guide 21 and the right sidewall 16 of the column 2.

As thus above, when the second spiral unit 50 is mounted, the wide products P are stored in a line only on the right side of the guide 21, and the spiral 20 is rotated one turn at a time, whereby the products can be sequentially dispensed from the right side of the guide 21 through the opening 22 below the column 2.

Note that the spiral-type object dispensing unit 1 according to the present embodiment is configured to be detachable from the vending machine, and hence the first spiral unit 40 and the second spiral unit 50 in the column 2 can be easily interchanged with one another by once removing the spiral-type object dispensing unit 1 including the column 2 from the vending machine at the time of the interchange.

As described above, the spiral-type object dispensing unit 1 according to the present embodiment includes the first spiral unit 40 that includes the first guide 41 extending in the vertical direction on the central axis of the spiral 20 and the second spiral unit 50 that includes the second guide 51 extending to the left of the column 2 from the central axis of the spiral 20, and either of these spiral units 40, 50 can be provided in the column 2 in an interchangeable manner. Further, the motor unit 3 can be moved in the width direction of the column 2, and the central axis of the rotary shaft 14 of the motor 11, that is, the central axis of the spiral 20, can be installed so as to be movable in the width direction of the column 2.

By disposing the spiral 20 at the center position in the width direction of the column 2 and using the first spiral unit 40 that includes the first guide 41, the first guide 41 is located at the center position in the width direction of the column 2, and products P with substantially the same width can be stored in the column 2 to the left and right of the first guide 41.

On the other hand, by using the second spiral unit 50 that includes the second guide 51 extending at a position different in the width direction of the column 2 from (to the left of) the central axis SCL of the spiral 20, a product P with a large width can be stored in one of the left and right sides (right side) of the second guide 51. Further, by moving the spiral 20 in the width direction of the column 2 (to the left) from the center position in the width direction and disposing the spiral 20, the second guide 51 can be further moved in the width direction of the column 2 (to the left), to store objects with a further larger width in the column on the right side of the second guide 51.

The upper end of the guide 21 (the first guide 41 and the second guide 51) supports the rotary shaft 14 of the motor 11, so that the swing of the rotary shaft 14, that is, the swing of the spiral 20, at the time of the rotation operation of the motor 11 can be prevented. Further, the guide 21 can prevent the movement of the product P in the left-right direction (the width direction of the column 2) when the spiral 20 is rotated at the time of dispensing the product from the column 2, thereby promoting smooth dispensing.

The column 2 includes the first support 44 for supporting a support plate 43 that is the lower end of the first guide 41, and also has a second support 52 for supporting the lower end of the second guide 51, so that the first spiral unit 40 and the second spiral unit 50 can be easily and mounted in the column 2 in an interchangeable manner.

The first support 44 is provided on the rear wall 17 of the column 2, and the support plate 43 for supporting the lower end of the central shaft 42 is disposed to extend toward the first support 44 in the rear of the column 2, whereby the products P stored on the left and right sides of the central shaft 42 can be dispensed downward without being hindered by the support plate 43.

Meanwhile, the second support 52 is provided on the left sidewall 15 of the column 2, so that the length of the portion extending in the radial direction of the spiral 20 at the lower end of the second guide 51 can be reduced to effectively prevent the swing of the second guide 51, that is, the swing of the spiral 20 during the rotation of the spiral 20.

The base plate 13 of the motor unit 3 is mounted on the upper wall 12 of the column 2 and is slidably supported relative to the upper wall 12. The screw 35 with its hemispherical head facing downward is provided on the lower surface of the base plate 13, the head of the screw 35 is in contact with the upper wall 12 of the column 2, and the base plate 13 and the upper wall 12 of the column 2 are separated from each other, so that a frictional force at the time of sliding the base plate 13 relative to the column 2 can be reduced, and sticking between the base plate 13 and the upper wall 12 of the column 2 due to ice, frost, or the like can be prevented The protrusions 32, 33 are provided on the upper wall 12 of the column 2, and the position of the base plate 13 in the width direction relative to the column 2 can be set by moving the base plate 13 forward perpendicular to the width direction of the column 2 and inserting either of the protrusions 32, 33 into the positioning hole 34 of the base plate 13. With the protrusions 32, 33 being disposed corresponding to the sliding positions (center position and sliding position) of the motor unit 3, the sliding position of the motor unit 3 can be easily set to either the center position or the sliding position.

Further, due to the marked identification of the first support 44 indicating that the first support 44 is to be used when the first spiral unit 40 is mounted and the marked identification of the second support 52 indicating that the second support 52 is to be used when the second spiral unit 50 is mounted, the first spiral unit 40 and the second spiral unit 50 can be easily mounted in the column 2.

The present invention is not limited to the above embodiment. For example, the sliding position of the motor unit 3 relative to the column 2 can be set at a plurality of locations as appropriate. As for the spiral unit 4, the diameter of the spiral 20 may be suitably changed, the position and shape of the guide 21 may be suitably changed from those of the first guide 41 and the second guide 51, and a plurality of types of spiral units 4 may be prepared in addition to the first spiral unit 40 and the second spiral unit 50 so as to be interchangeable.

In the above embodiment, the spiral 20 is configured to be movable in the left-right width direction of the column 2, but the spiral 20 may be configured to be movable in the front-rear width direction of the column 2. In a case where the spiral 20 is configured to be movable in the rear of the column 2, the second support 52 for supporting the lower end of the second guide 51 may be provided at the lower portion of the rear wall 17 of the column 2.

In the above embodiment, the column 2 is long in the vertical direction, and the spiral 20 of the spiral-type object dispensing unit 1 is installed so as to extend in the vertical direction, but the present invention is also applicable to the column 2 installed so as to extend in a direction except for the vertical direction, that is, a unit that dispenses a product in a direction except for the downward direction.

The spiral-type object dispensing unit according to the present invention is widely applicable to units for storing and dispensing objects in various systems in addition to vending machines.

EXPLANATION OF REFERENCE SIGNS

1 spiral-type object dispensing unit
2 column
3 motor unit (motor part)
12 upper wall (wall surface)
15 left sidewall (sidewall)
17 rear wall
20 spiral
21 guide
40 first spiral unit
41 first guide
44 first support
50 second spiral unit
51 second guide
52 second support

The invention claimed is:

1. A spiral-type object dispensing unit comprising:
a column having an opening on at least one surface;
a motor part supported by the column; and
a spiral disposed in the column, the spiral being detachably joined to a rotary shaft of the motor part at one end and extending spirally toward the opening of the column at an other end to support an object,
the spiral-type object dispensing unit sequentially dispensing the object supported by the spiral from the opening of the column by the motor part rotating and driving the spiral, wherein
the spiral-type object dispensing unit comprises a guide extending from the one end to the other end of the spiral and is supported at one end by the one end of the spiral or the rotary shaft of the motor part, while the other end is detachably supported by the column on an other end side of the spiral,
the spiral is supported so as to be movable in a width direction of the column,
the guide is interchangeable between a first guide that extends at least on a central axis of the spiral and allows objects of approximately the same width to be stored in the column on the left and right side of the guide, and a second guide that extends at a position different from the central axis of the spiral in the width direction of the column and allows objects of a larger width than the objects of same width to be stored in the column on either the left and right side of the guide, and
either the first guide or the second guide is movable together with the spiral in the width direction of the column.

2. The spiral-type object dispensing unit according to claim 1, wherein
the column includes
a first support that supports the other end side of the first guide, and
a second support that supports the other end side of the second guide.

3. The spiral-type object dispensing unit according to claim 1, wherein
the spiral and the first guide constitute a first spiral unit,
the spiral and the second guide constitute a second spiral unit, and
one of the first spiral unit and the second spiral unit is selectively disposed in the column.

4. The spiral-type object dispensing unit according to claim 1, wherein
the first guide extends on the central axis of the spiral; and
the spiral is movable to a center position in the width direction of the column.

5. The spiral-type object dispensing unit according to claim 4, wherein
the central axis of the spiral extends in a vertical direction and is disposed such that the one end is on an upper side and the other end is on a lower side,
the column has at least a rear wall and left and right sidewalls,
the first guide is supported by the rear wall of the column at the other end side, and
the second guide is supported by one of the left and right sidewalls of the column at the other end side.

6. The spiral-type object dispensing unit according to claim 1, wherein the motor part is supported on a wall surface of the column on the one end side of the spiral so as to be slidable at least in the width direction of the column.

7. The spiral-type object dispensing unit according to claim 6, wherein the motor part is fixed to the column by being moved to a wall surface of the column at a selected position among a plurality of positions in the width direction of the column.

8. The spiral-type object dispensing unit according to claim 2, wherein the first support and the second support are each marked with an identification indicating that the first support or the second support is used in correspondence with the first guide or the second guide.

* * * * *